United States Patent [19]
Peterson et al.

[11] 3,986,414
[45] Oct. 19, 1976

[54] FRICTION DISC PLANETARY TRANSMISSION

[75] Inventors: James F. Peterson, Cedarburg; Edward Freier, Jr., Port Washington, both of Wis.

[73] Assignee: Allis-Chalmers Corporation, Milwaukee, Wis.

[22] Filed: Dec. 8, 1975

[21] Appl. No.: 638,756

[52] U.S. Cl. .................. 74/691; 37/43 R; 74/194
[51] Int. Cl.² .......... F16H 15/04; F16H 13/10; F16H 15/08; B60K 17/28
[58] Field of Search .......... 74/691, 690, 700, 194, 74/196; 37/43 A, 43 R, 43 B, 43 C, 43 D, 43 E, 43 F, 43 G, 43 H, 43 K, 43 L, DIG. 17

[56] References Cited
UNITED STATES PATENTS

| | | | |
|---|---|---|---|
| 805,504 | 11/1905 | Trufant | 74/691 |
| 1,250,967 | 12/1917 | Clark | 74/691 |
| 1,284,058 | 11/1918 | Clark | 74/691 |
| 1,423,067 | 7/1922 | Aymard | 74/691 |
| 1,576,399 | 3/1926 | Aymard | 74/691 |
| 1,626,611 | 5/1927 | James | 74/691 |
| 3,580,351 | 5/1971 | Mollen | 37/43 E |

*Primary Examiner*—Samuel Scott
*Assistant Examiner*—Allan R. Burke
*Attorney, Agent, or Firm*—Charles L. Schwab

[57] ABSTRACT

The carriage for the friction driving disc of a friction disc planetary transmission is shiftable axially on a pivot shaft by a manually operated cam to change the contact path of a pair of driven friction wheels connected to input gears of a planetary unit to effect infinitely variable forward and reverse speeds and neutral. The pivot shaft is transverse to and spaced from the axis of the driving disc. The driving disc is driven by a belt which, when placed under driving tension urges the carriage to pivot about its pivot shaft in a direction urging the friction driving disc against the driven friction wheels. Additionally, the carriage is urged by a pair of springs in the same direction to insure proper frictional engagement of the driving disc with the driven wheels. In order to insure proper proportioning of pressure exerted by the driving disc against the driven wheels, the driving disc support is pivoted to the carriage on an axis lying in the plane of the friction face of the driving disc and intersecting the axis of the driving disc. The biasing springs are connected to the driving disc support and are oriented in relation thereto in such a way as to insure normal driving pressure between the driving disc and the driven wheels throughout the range of axial shifting of the carriage on its pivot shaft. The carriage pivot shaft is connected at its opposite ends to spaced walls of the transmission housings in a manner permitting vertical adjustment of either or both ends. These adjustments permit proper alignment of the driving disc with the driven wheels. A clutching device is provided to disengage the driving disc from the driven wheels to provide free wheeling. The planetary unit is carried on a shaft mounted on the spaced walls of the transmission housing in a manner permitting removal of the planetary unit and shaft as an assembly.

35 Claims, 10 Drawing Figures

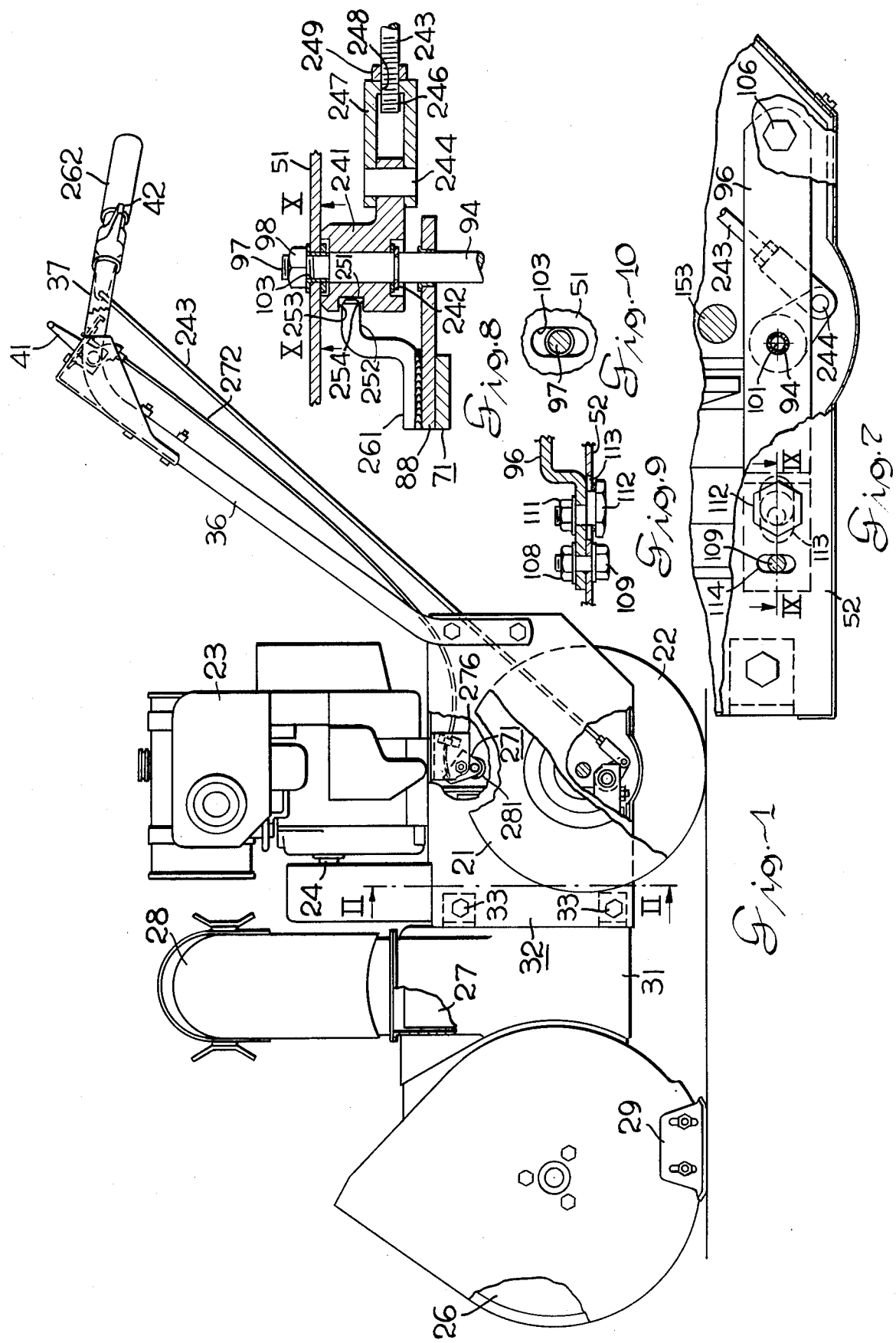

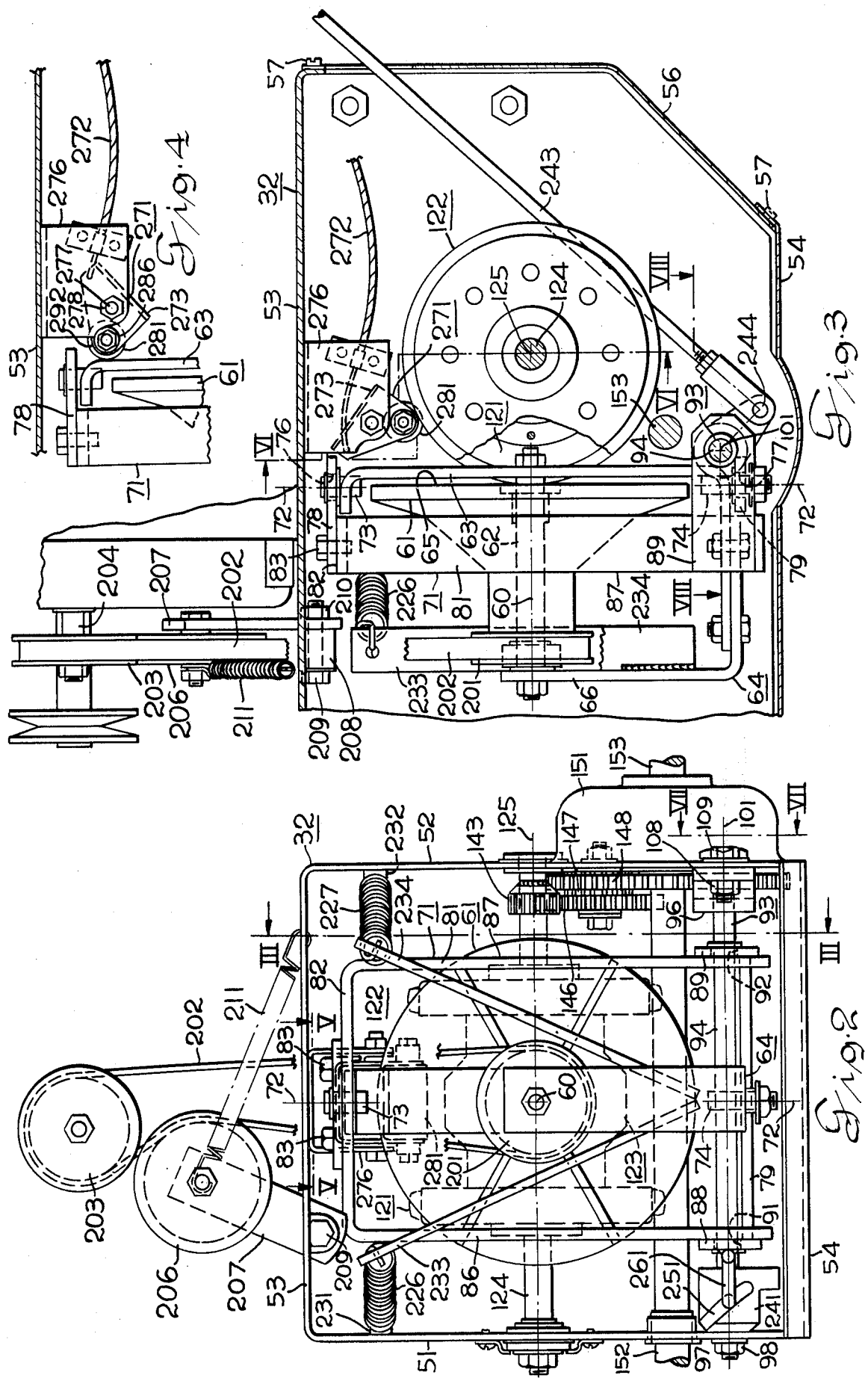

FRICTION DISC PLANETARY TRANSMISSION

BACKGROUND OF THE INVENTION

Heretofore, others have suggested friction disc planetary transmissions. One such transmission is shown in U.S. Pat. No. 1,423,067, wherein the driving disc is shifted in the direction of the axis of the driven wheels so as to provide infinitely variable forward and reverse output speeds from the bevel gear planetary unit whose side gears carry driven friction wheels. A coil spring surrounding the input shaft to which the driving disc is connected provides the required pressure for the driving disc against the driven friction wheels. Free wheeling of the transmission is achieved by a foot pedal operated throwout connected to move the input shaft and the driving disc axially away from the driven friction wheels.

Another pertinent prior art patent is U.S. Pat. No. 1,576,399 wherein a planetary unit housing provides the support for the friction wheel planetary transmission and wherein a friction disc is mounted for shifting movement in the direction of the axis of an input shaft, the latter being connected to one side gear and to one of the friction wheels. The friction disc is mounted on a shaft which is pivotally supported on the planetary housing for swinging movement about an axis perpendicular to and intersecting the axis of the driving disc shaft. The input to one of the friction wheels also inputs at the same speed to the planetary unit through a side gear, and the driving disc which is driven by the first mentioned friction wheel drives a second friction wheel which is connected to the other side gear. The output shaft of the transmission is connected to the spider carrying the planet bevel gears. Means are provided to provide a direct drive through the planetary unit by disengaging the driving disc and braking the friction wheel which is not associated with the input shaft.

BRIEF DESCRIPTION OF THE INVENTION

A friction disc planetary transmission is provided in which a driving disc is connected to a source of power by way of a flexible belt driving a pulley secured to the driving disc. The driving disc is rotatably journaled on a carriage assembly which includes a driving disc support pivotally mounted on a carriage on an axis which is transverse to the axis of the driving disc and to the axis of the driven friction wheels inputting to a planetary unit. The carriage is slidably and pivotally mounted on a rod or pivot shaft disposed parallel to the axis of the driven friction wheels, and in spaced relation thereto, and at right angles to the axis of the friction disc. This last mentioned pivot connection permits the carriage to be slid in the direction of the axis of the driven friction wheels by pivotal cam means whereby the output speed of the transmission may be infinitely varied in forward and reverse directions between zero and predetermined maximum speeds. The belt driving the pulley connected to the friction driving disc tends to pull the friction disc into engagement with the driven friction wheels. Additionally, spring means are provided to supplement the engaging force of the driving friction disc against the driven friction wheels. The shaft on which the carriage is slidably mounted is adjustably secured to the side walls of the transmission housing so as to permit accurate alignment of the friction disc and the driven friction wheels so as to achieve a natural neutral condition. A clutching throwout mechanism is associated with the carriage assembly to force the driving friction disc away from the driven friction wheels thereby achieving a free-wheeling condition.

It is an object of this invention to provide an improved friction disc planetary transmission wherein the rotation of the output shaft can be varied between predetermined forward and reverse maximum speeds by a manually operated control and wherein a manually operated throwout is operable to move the friction disc away from the driven friction wheels to achieve a free-wheeling condition.

It is a further object of this invention to provide a friction disc planetary transmission wherein the drive belt urges the friction disc into engagement with the driven friction wheels.

It is a further object of this invention to provide a friction disc planetary transmission wherein the driving friction disc is mounted for sliding and pivotal movement and is biased into engagement with the driven friction wheels by a pair of springs disposed in such a manner as to exert proper pressure against both of the driven friction wheels in all adjusted positions of the friction disc relative to the driven friction wheels.

It is a further object of this invention to provide a friction disc planetary transmission wherein means are provided to adjust the position of the friction driving disc to achieve proper alignment for a natural neutral condition to which the transmission will tend to adjust itself if not controlled by operating means.

It is a further object of the present invention to provide a friction disc planetary transmission which is easy to adjust, service and repair.

It is a further object of the present invention to provide a friction disc planetary transmission which is particularly adapted for low horsepower requirements and is of a configuration that is particularly suitable for use in a snowblower.

These and other objects and advantages of the present invention will be apparent when the following description is read in conjunction with the drawings.

BRIEF DESCRIPTION OF THE DRAWINGS

The invention is illustrated by the drawings in which:

FIG. 1 is a side view of a snowblower incorporating the transmission of the present invention;

FIG. 2 is a section taken along the line II—II in FIG. 1 in showing an end view of the transmission of the present invention;

FIG. 3 is a section taken along the line III—III in FIG. 2;

FIG. 4 is a view of the clutching mechanism showing it adjusted to a friction disc disengaging condition;

FIG. 7 is a section taken along the line VII—VII in FIG. 2;

FIG. 8 is a section taken along the line VIII—VIII in FIG. 3;

FIG. 9 is a section taken along the line IX—IX in FIG. 7; and

FIG. 10 is a section taken along the line X—X in FIG. 8.

DETAILED DESCRIPTION OF THE DRAWINGS

Figure 5:
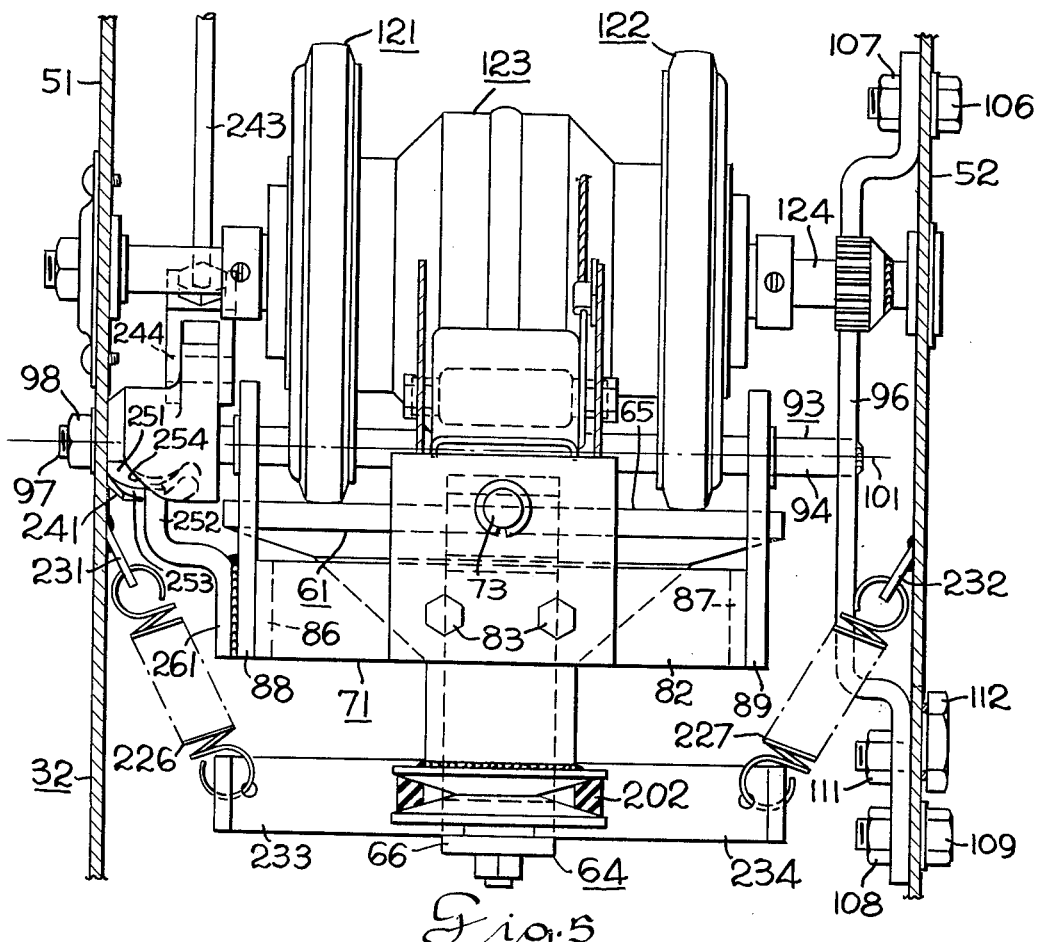
FIG. 5 is a section taken along the line V—V in FIG. 2.

Referring to FIG. 1, there is illustrated a walk-behind snowblower having a pair of rear drive wheels 21, 22 which are driven by a small air-cooled, internal combustion engine 23 by way of its output shaft 24 on an infinitely variable speed, forward-reverse transmission which will hereinafter be described in greater detail. The snowblower includes a front snow auger 26 and discharge impeller 27 for removing the snow and discharging it by way of a discharge chute 28. The front end of the snowblower is supported by a pair of adjustable skids 29, only one of which is shown. The front snowblower housing 31 is secured to a rear transmission housing 32 by suitable releasable fastening means such as cap screws 33. A pair of operator handles 36, 37 are secured to the rear of the side walls of the transmission housing by suitable nuts and bolts and support suitable engine controls (not shown), a clutch control for the snowblower drive (not shown) and manual control levers 41, 42 which are operatively associated with the transmission which will hereinafter be described in greater detail.

Referring to FIGS. 2, 3 and 5, the friction disc planetary transmission of the present invention will now be described in detail. The transmission housing includes a pair of laterally opposite and generally parallel side walls 51, 52 which are joined at the top by a generally horizontal top wall 53 to which the base of the engine 23 is rigidly secured. The transmission housing includes a bottom wall 54 and a removable rear wall 56 which is releasably secured to the rear end of the transmission housing by cap screws 57. The driving friction disc 61 which is preferably made of metal is rotatably mounted on a stationary shaft 62 which is rigidly secured at its front end to a front leg 63 of a U-shaped driving disc support 64 and its rear end is rigidly secured to the rear leg 66 of the support 64. The U-shaped driving disc support 64 is pivotally connected to a carriage 71 on a vertical axis 72 by pins 73, 74 which are secured as by welding to the U-shaped driving disc support 64 and are disposed in bores 76, 77 in an upper horizontal plate 78 and a lower transverse plate 79 of the carriage 71. The driving disc support 64 is thus pivoted to the carriage 71 on a vertical axis 72 which lies approximately in the plane of the friction surface 65 of the driving disc 61 and passes through the axis 60 of the driving disc 61. The vertical axis 72 is at right angles to the axis 60 of the driving disc 61 and is coplanar therewith. It should also be noted that the axis 60 of the driving disc 61 intersects axis 125 of the output shaft and thus is coplanar therewith.

The carriage 71 includes an arch or inverted U-shaped member 81 having a horizontal top portion 82 to which plate 78 is secured by a pair of cap screws 83. The inverted U-shaped member 81 of the carriage 71 has a pair of downwardly extending legs 86, 87 to which a pair of horizontal extensions 88, 89 are secured as by welding. The transverse plate 79 is welded at its opposite ends to the laterally inner sides of the extensions 88, 89. Aligned bores 91, 92 are formed in the extensions 88, 89 of the carriage and slidably and pivotally engage a carriage support 93. The carriage support 93 includes a cylindrical rod 94 which is welded to a mounting strap 96 at one end and which is threaded at its other end 97 to receive a nut 98. The carriage support 93 establishes a pivot axis 101 for the carriage 71. The vertical position of the pivot axis 101 can be adjusted on the left side, as viewed in FIG. 2, by loosening the nut 98 and adjusting the vertical position of the end 97 of the rod 94 upwardly or downwardly in the slot 103 in the side wall 51 of the transmission housing 32. This slot is illustrated in FIGS. 8 and 10. The vertical position of the right end of the carriage support 93, as viewed in FIG. 2, can be adjusted by pivoting the strap 96 about its pivot connection with the side wall 52 of the transmission housing, which connection is established by a bolt 106 and a nut 107. This is accomplished by loosening a nut 108 on a bolt 109 at the front end of the horizontally disposed strap 96, then loosening a nut 111 on an eccentric 112 and then rotating the eccentric 112 in one direction or the other to achieve an upward or downward movement of the forward end of the strap 96. The side wall 52 has an elongated horizontal slot 113 to accommodate the movement of the eccentric when such adjustment is made. Vertical movement of the bolt 109 relative to the side wall 52 of the transmission housing 32 is permitted by a vertical slot 114 in the side wall 52. The vertical adjustment of the carriage support 93 for the carriage 71 permits accurate alignment of the driving disc 61 with the driven friction wheels 121, 122 of the planetary unit 123. Such adjustment helps to achieve a natural neutral condition of the planetary unit 123 wherein its output shaft 124 does not rotate. During running of the driving disc and planetary assembly, if the driving disc is free from lateral shifting bias, it will tend to seek a position of balanced forces in relation to reaction forces from the driven friction wheels 121, 122. It is desirable that this natural balanced force condition of the driving disc coincide with the neutral condition wherein the driven friction wheels 121, 122 rotate at equal speeds (thus producing zero output speed of the shaft 124).

The planetary unit 123 is supported by its output shaft 124 which is rotatably supported by the housing side walls 51, 52. The output shaft 124 is journaled on an axis 125 in side wall 51 by a sleeve bearing 126 carried in a bearing support 127 held in place in a cylindrical opening 128 in the side wall 51 by a bearing retainer 129. A shoulder is provided by a radial flange 131 on bearing support 127 and is in axial thrust transmitting relation to the laterally outer side of the transmission housing side wall 51. The releasable bearing retainer 129 is releasably secured to the side wall 51 by screws 132 and serves to hold the bearing support 127 against axial shifting movement away from the side wall 51. The bearing support 127 is held against movement relative to the output shaft 124 by a snap ring 136 and washer 137, the latter bearing against a shoulder 138 on the end of the shaft 124 and held in place by a nut 139 in threaded engagement with a threaded end portion 141 of the shaft 124. The other end of the output shaft 124 is rotatably and slidably journaled in a sleeve bearing 142 releasably secured by a bearing retainer, not shown, to the transmission housing side wall 52. An output pinion 143 is welded to the output shaft 124; and, as shown in FIG. 2, meshes with gear 146 of the gear cluster which includes a smaller diameter gear 147. The smaller diameter gear meshes with gear 148 of a differential housed within the bulge 151 of transmission housing side wall 52 which provides output torque to drive shafts 152, 153 connected to the drive wheels 21, 22.

Figure 6:
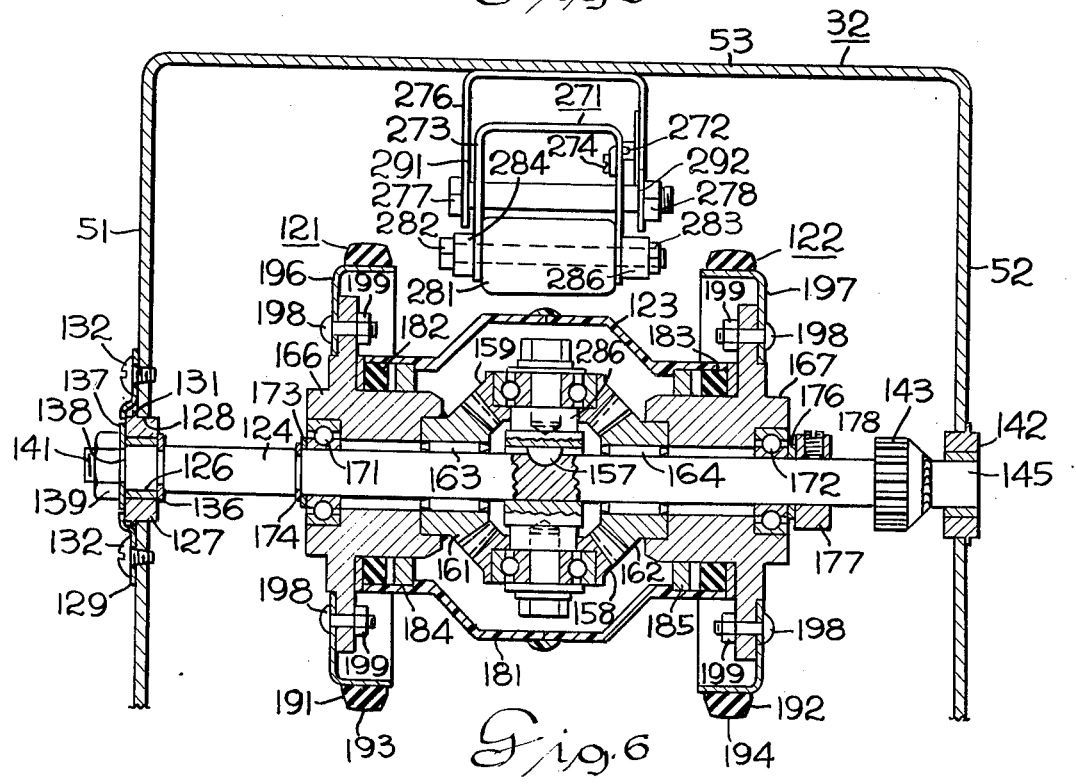
FIG. 6 is a section taken along the line VI—VI in FIG. 3.

As shown in FIG. 6, the planetary unit output shaft 124 is keyed to a planet carrier 156 by a key 157. The planet carrier 156 rotatably carries a pair of bevel planet gears 158, 159 which mesh with bevel side gears 161, 162 rotatably carried on the shaft 124 by needle bearings 163, 164. The side gears 161, 162 are welded to the hubs 166 and 167 of the driven friction wheels 121, 122. The hubs 166 and 167 are carried on the shaft 124 by ball bearings 171, 172 and the inner raceway of bearing 171 is prevented from movement in one axial direction by the cooperative engagement of a washer 173 with a snap ring 174 carried in an annular snap ring groove in the shaft 124. At the other end of the planetary unit, a washer 176 is held in axial thrust transmitting relation to the inner raceway of rollr bearing 172 by a stop ring or sleeve 177 nonrotatably secured to the shaft by a set screw 178. The gears of the planetary unit are provided with a cylindrical symetrical plastic cover or enclosure 181 which has its axially opposite annular ends in sealing engagement with the hubs 166, 167 of the driven friction wheels by annular seals 182, 183. Suitable sleeve bearings 184, 185 are mounted at axially opposite ends of the enclosure 181 to permit relative rotation between the cover and the hubs 166, 167 of the driven friction wheels 121, 122. The driven friction wheels are provided with annular treads 191, 192 presenting annular friction surfaces 193, 194 in friction engagement with the driving disc friction surface 65. The treads 191, 192 are bonded to metal rims 196, 197 which in turn are releasably secured to the hubs 166, 167 by releasable fastening members in the form of bolts 198 and nuts 199. The treads 191, 192 may be made of suitable plastic material with good power transmitting and wearing qualities.

If it is desired to remove the planetary unit 123, it is merely necessary to remove the bearing retainer 129, nut 139 and bearing support 127; and then slide the output shaft 124 to the left as viewed in FIG. 6 until the other end 145 of the shaft 124 clears the bearing 142. The planetary unit 123 may then be withdrawn at an angle rearwardly upon removing the rear cover 56 from the transmission housing 32.

Referring again to FIGS. 2, 3 and 5, the driving disc 61 has secured thereto, as by welding, a V-belt pulley 201. A V-belt 202 is driven by a pulley 203 nonrotatably secured to the output shaft 204 of the engine 23. The belt 202 drivingly engages the driving disc pulley 201 and is properly tensioned by an idler pulley 206 which is supported on an idler arm 207. The idler arm 207 is pivotally connected to a bracket 208 on the top wall 53 of the transmission housing 32 by a bolt 209 and nut 210. An appropriate transverse slot (not shown) is provided in the top wall 53 to insure freeswinging movement of the idler arm 207. A tension spring 211 has its opposite ends connected to the idler arm 207 and transmission housing 32 and serves to exert the proper force against the arm so that the idler pulley 206 properly tensions the drive belt 202. Placing the driving belt 202 under tension tends to cause the carriage 64 for the driving disc 61 to be pivoted in a clockwise direction as viewed in FIG. 3 about its pivot axis 101; that is, about the carriage support 93. Thus, the tension in the driving belt helps to keep the friction face 65 of the driving disc 61 against the friction surfaces 193, 194 of the driven friction wheels 121, 122. Additional pressure or force is exerted against the driven friction wheels by the driving disc 61 through action of a pair of tension springs 226, 227 which are connected at their rear ends to brackets 231, 232 welded to the side walls 51, 52 of the transmission housing 32. The springs 226, 227 lie substantially in a common horizontal plane and extend forwardly in diverging relation to one another, terminating in front ends which are connected to mounting brackets 233, 234 welded to the leg 66 of the carriage 64.

In the drawings, the transmission is shown in its neutral condition. Such condition is effected when the driving disc axis 60 is centered between the driven friction wheels 121, 122 wherein the speed of rotation of the driven wheels 121, 122 is the same but in opposite directions. When this occurs, the planet carrier 156 is not driven and the output shaft 124 does not turn. The output shaft 124 will be rotated in one direction or the other depending on which direction the driving disc 61 is shifted axially in relation to the shaft 124. This shifting movement of the carriage 71 and the driving disc 61 is effected by a shifting member in the form of a cam 241 rotatably mounted on the rod 94 of the carriage support 93 as shown in FIG. 8. The cam 241 is held against axial movement relative to the rod 94 by a snap ring 242 and by the side wall 51 of the transmission housing 32. The cam 241 is rotated by the manual control lever 42 through a control rod 243 pivotally connected at its upper end to the pivoted control lever 42 and pivotally connected at its lower end to the cam 241 by a pin 244. The lower end of the rod 243 includes a threaded portion 246 which threadedly engages a drilled and tapped opening 248 in a yoke 247 with aligned bores for receiving the pin 244. Upon loosening a jam nut 249, the length of the control rod may be adjusted by turning the rod in its threaded engagement with the yoke 247 and upon retightening of the locking nut 249, the rod 243 is securely held in place in relation to the yoke 247. The cam 241 has a milled helical camming slot 251 formed therein which cooperatively engages a cam follower finger 252 of a cam follower 261 welded to the extension 88 of the carriage 71.

When the control rod 243 is shifted upwardly by the control lever 42 adjacent the handle grip 262 on handle 37, the cam follower 261 will be moved in one axial direction by the camming action of the spiral walls 253, 254 defining the slot 251 thereby moving the friction driving disc 61 from its illustrated neutral position to a position of axial adjustment relative to the carriage support 93 and relative to the output shaft 24 whereby the driven friction wheels 121, 122 track on the friction surface 65 of the driving disc on circles of different radii. This produces a difference in rotational speed of the side gears 161, 162 thereby causing the planet carrier 156 to rotate in a predetermined direction at a predetermined speed. Shifting the driving disc in one direction from its illustrated neutral position will produce a forward drive, and shifting it in the other direction from its neutral position will produce a reverse drive.

Referring to FIGS. 1, 2, 3, 4, 5 and 6, a freewheeling or clutched condition of the transmission can be achieved by operating the control lever 41 which is connected to a throwout mechanism 271 by a bowden wire 272 having its end remote from the control lever 41 connected to a U-shaped lever 273 by a screw 274. The U-shaped lever 273 is pivotally connected to a bracket 276 depending from the top wall 53 of the housing 32 by a pivot member in the form of bolt 277 held in place by a nut 278. The lower end of the throwout lever 273 carries thrust transmitting means in the form of a roller 281 pivotally mounted on a bolt 282 secured by a nut 283. A pair of sleeves 284, 286 serving as abutments are carried by the bolt 282 on the laterally outer sides of the downwardly extending legs of the lever 273. As shown in FIG. 3, the throwout mechanism 271 is shown in a nonclutching position in which the transmission is operative, that is, the driving disc 61 is in driving transmission engagement with the driven friction wheels 121, 122. Upon shifting movement of the hand control lever 41, the throwout lever 273 is shiftable to a clutching position, as shown in FIG. 4, wherein the abutments 284, 286 engage complementary abutment surfaces 291, 292 on the legs of the support bracket 276. As shown in FIG. 4, the throwout mechanism is in an overcenter position with the roller 281 having abutted the member 63 of the carriage assembly to move the driving disc 61 out of engagement with the driven friction wheels 121, 122. In the overcenter, free-wheeling position of the throwout mechanism 271, as illustrated in FIG. 4, there is no driving connection between the engine and the drive wheels and, thus, in this condition the engine can be more easily started; and if the snowblower is to be moved manually without the engine running, the operator can manually move the snowblower with greater ease.

By providing a vertical pivot axis 72 for the driving disc support 64, proper thrust transmitting engagement between the disc face 65 and the driven friction wheels 121, 122 is ensured. The pivot axis 72 is at right angles to the axis 101 of the rod 94 and is at right angles to the axis 125 of the output shaft 124. This transmission is very compact, is easily adjusted and serviced and permits the operator to choose the exact operating speed needed for the work to be done.

The embodiments of the invention in which an exclusive property or privilege is claimed are defined as follows:

1. A friction disc planetary transmission comprising:
    a housing;
    a planetary unit mounted in said housing having
        a rotary output member and
        a pair of rotary input members
    a pair of driven friction wheels mounted on a first axis and connected in driving relation to said input members, respectively;
    a carriage assembly including
        a carriage supported on said housing for pivotal movement about a second axis parallel to said first axis and for axial shifting movement in relation to said second axis, and
        a driving disc support pivotally connected to said carriage on a third axis disposed at right angles to said first and second axes;
    a driving disc supported on said disc support for rotation about a fourth axis at right angles to and intersecting said third axis and disposed in spaced relation in one direction from said second axis, said driving disc being disposed in driving relation to said driven friction wheels whereby the latter are driven in opposite directions; and
    resilient biasing means urging said carriage assembly to pivot about said second axis in one direction to place said driving disc in frictional driving engagement with said driven wheels.

2. The transmission of claim 1 and further comprising a drive pulley secured for rotation with said driving disc and wherein said resilient biasing means includes a resilient drive belt cooperatively engaging said drive pulley and operative when under driving tension to urge said carriage assembly to pivot in said one direction.

3. The transmission of claim 1 and further comprising means for adjusting the position of said second axis relative to said housing.

4. The transmission of claim 1 wherein said driving disc includes an annular driving face adapted to contact said driven friction wheels at diametrically opposite sides of said fourth axis.

5. The transmission of claim 1 and further comprising a throwout mechanism including a throwout lever with thrust transmitting means, said throwout lever being pivotally mounted on said housing for pivotal movement in a predetermined direction from an inoperative position to a throwout position wherein said thrust transmitting means engages and pivots said carriage assembly about said second axis in the direction opposite to said one direction whereby said driving disc is moved out of driving engagement with said driven friction wheels.

6. The invention of claim 5 wherein said throwout lever is in an overcenter position in said throwout position and further comprising cooperatively engageable abutment means on said housing and said throwout lever, said abutment means engaging when said lever is pivoted to its throwout position to prevent further movement of said lever in said predetermined direction.

7. The transmission of claim 1 wherein said driven friction wheels are of the same diameter and are rigidly secured to said input members for coaxial rotation therewith and wherein said output member includes an output shaft on which said input members are rotatably mounted on said first axis.

8. The transmission of claim 7 wherein said housing includes an access opening and a pair of spaced walls with aligned openings and further comprising bearing means in said openings rotatably supporting opposite ends of said shaft and releasable retention means preventing axial shifting movement of said shaft relative to said housing, said shaft supporting said planetary unit and being axially shiftable upon release of said retention means whereby said planetary unit may be removed from said walls and from said housing through said opening.

9. The transmission of claim 8 wherein one of said bearing means comprises a bearing positioned in one of said aligned openings and said retention means serving to releasably retain said bearing in said one opening.

10. The transmission of claim 1 and further comprising shift means operable to shift said carriage assembly axially on said second axis including a cam rotatably mounted in said housing for rotation about said second axis, a cam follower on said carriage assembly in cooperative engagement with said cam, and motion transmitting means connected to said cam operable to selectively rotate said cam whereby changes in speed and direction of said output member are obtained.

11. The transmission of claim 1 wherein said resilient biasing means includes resilient spring means operatively interconnected between said housing and said carriage assembly.

12. The transmission of claim 11 wherein said spring means includes a pair of tension springs having first corresponding ends connected to said housing and second corresponding ends connected to said carriage assembly.

13. The transmission of claim 12 wherein said second corresponding ends of said springs are connected to said driving disc support.

14. The transmission of claim 13 wherein said springs bias said driving disc support in opposite pivotal directions about said third axis and are disposed in converging relation to one another in the direction from said first to said second ends.

15. The transmission of claim 1 and further comprising a cylindrical cover for said planetary unit rotatably mounted on at least one of said driven friction wheels.

16. The transmission of claim 15 wherein said cover is rotatably mounted at its axially opposite ends on said driven friction wheels.

17. A transmission comprising:
a housing having spaced side walls,
a planetary unit in said housing including
an output shaft having opposite ends rotatably supported by said side walls, respectively, and rotatably supporting said planetary unit on a first axis,
a planet carrier secured to an intermediate part of said shaft for rotation therewith
a plurality of bevel planet gears rotatably supported on said planet carrier, and
a pair of rotary input members rotatably supported on said output shaft each including
a bevel side gear coaxial with said output shaft and meshing with said bevel planet gears and
a friction wheel coaxial with said output shaft
a carriage supported on said housing for pivotal movement about a second axis parallel to said first axis and for axial shifting movement in relation to said second axis;
a driving disc support pivotally connected to said carriage on a third axis disposed at right angles to said first and second axes;
a driving disc supported on said disc support for rotation about a fourth axis at right angles to and substantially in the same plane with said first axis, said fourth axis being disposed in spaced relation in one direction from said second axis, said driving disc having a flat annular friction surface in driving relation to said friction wheels, said friction wheels being on diametrically opposite sides of said fourth axis and being driven in opposite directions by said friction disc when engaging same; and
resilient biasing means urging said carriage to pivot about said second axis in one direction of rotation whereby said friction surface of said driving disc is placed in frictional driving engagement with said friction wheels.

18. The transmission of claim 1 and further comprising a drive pulley secured for rotation with said driving disc and wherein said resilient biasing means includes a resilient drive belt cooperatively engaging said drive pulley, said drive belt urging said carriage to pivot in said one direction when said drive belt is under driving tension.

19. The transmission of claim 17 and further comprising a round section symmetrical enclosure encompassing said bevel planet gears and bevel side gears, the axially opposite ends of said enclosure being in fluid tight sealing engagement with said input members and at least one of said ends of said enclosure being rotatably connected to the associated input member.

20. The transmission of claim 17 and further comprising a support rod supporting said carriage for pivotal and axial movement relative to said second axis and mounting means securing opposite ends of said rod to said side walls, respectively.

21. The transmission of claim 20 wherein said mounting means include means for adjusting said second axis relative to said first axis.

22. The transmission of claim 17 and further comprising manually operable shifting means connected to said carriage operable to shift the latter axially on said second axis.

23. The transmission of claim 22 wherein said shifting means includes cam and cam follower elements, one of said elements being secured to said carriage for axial movement therewith, the other of said elements being connected to said housing for movement relative to said one element but in axially fixed relation to said second axis.

24. The transmission of claim 23 wherein said other element is a cam element supported on said housing for pivotal movement about said second axis and includes a pair of spiral walls defining a helical slot and wherein said one element includes a cam follower finger in said slot cammingly engaging the side walls thereof.

25. The transmission of claim 17 wherein said biasing means includes a pair of springs having corresponding ends connected to said housing and said driving disc support.

26. The transmission of claim 25 and further comprising a throwout mechanism for selectively shifting said driving disc out of engagement with said friction wheels.

27. The transmission of claim 26 wherein said throwout mechanism includes an overcenter lever engageable with said driving disc support.

28. A transmission comprising:
a support structure,
a planetary unit including
an output shaft supporting said planetary unit on said support structure on a first axis,
a planet carrier element,
a plurality of planet gears rotatably mounted on said planet carrier element,
first and second gear elements meshing with said planet gears whereby said first and second gears turn in opposite directions,
means securing one of said elements to said shaft for rotation therewith, and
means rotatably journaling the other of said elements on said shaft,
a pair of annular friction treads secured for rotation with the other of said elements, respectively, on said first axis, said friction wheels having substantially equal diameters,
a carriage assembly including
a carriage supported on said support structure for pivotal movement about a second axis parallel to said first axis and for axial shifting movement in relation to said second axis, and
a power input driving disc support pivotally connected to said carriage on a third axis disposed at right angles to said first and second axes;
a driving disc supported on said disc support for rotation about a fourth axis at right angles to said first, second and third axes and disposed in spaced relation in one direction from said second axis, said driving disc having a substantially flat annular friction surface with diametrically opposite portions disposed in driving relation to said friction treads whereby the latter are driven in opposite directions; and resilient biasing means urging said carriage to pivot about said second axis in a first direction of rotation whereby said friction surface of said driving disc is urged into frictional driving engagement with said friction treads.

29. The transmission of claim 28 and further comprising a drive pulley secured for rotation with said driving disc and wherein said resilient biasing means includes a resilient drive belt cooperatively engaging said drive pulley, said drive belt urging said carriage to pivot in said first direction when said drive belt is under power transmitting tension.

30. The transmission of claim 28 wherein said one element is said planet carrier element.

31. The transmission of claim 30 wherein said gears are bevel gears.

32. The transmission of claim 31 and further comprising an enclosure for said planetary unit having annular portions in sealing engagement with said first and second gear elements, said enclosure being rotatably connected to at least one of said gear elements.

33. The transmission of claim 28 and further comprising change speed adjusting means including a shifting member operable to move said carriage axially on said second axis.

34. The transmission of claim 33 and further comprising a clutch mechanism operatively associated with said carriage assembly permitting selective pivoting of the latter about said second axis in a direction opposite to said first direction whereby said driving disc is disengaged from said friction treads.

35. The transmission of claim 33 and further comprising a pulley secured for rotation with said driving disc and wherein said resilient biasing means includes a resilient drive belt cooperatively engaging said drive pulley.

* * * * *